United States Patent
Kawabata

(10) Patent No.: US 8,239,155 B2
(45) Date of Patent: Aug. 7, 2012

(54) TRACK INFORMATION PROCESSOR, TRACK INFORMATION PROCESSING METHOD, INFORMATION RECORDING MEDIUM, AND PROGRAM

(75) Inventor: Yasuhiro Kawabata, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1025 days.

(21) Appl. No.: 12/279,632

(22) PCT Filed: Feb. 15, 2007

(86) PCT No.: PCT/JP2007/052736
§ 371 (c)(1),
(2), (4) Date: Aug. 15, 2008

(87) PCT Pub. No.: WO2007/094411
PCT Pub. Date: Aug. 23, 2007

(65) Prior Publication Data
US 2010/0231526 A1    Sep. 16, 2010

(30) Foreign Application Priority Data
Feb. 17, 2006 (JP) .................. 2006-040445

(51) Int. Cl.
*G06F 3/041* (2006.01)

(52) U.S. Cl. .................. 702/95; 702/150; 345/178

(58) Field of Classification Search ............... 702/85, 702/94, 95, 150; 345/173, 178; 178/18.02, 178/18.03, 20.01
See application file for complete search history.

(56) References Cited

U.S. PATENT DOCUMENTS
6,359,616 B1    3/2002    Ogura et al.
(Continued)

FOREIGN PATENT DOCUMENTS
EP    0684579 A2    11/1995
(Continued)

OTHER PUBLICATIONS

Taiwanese Office Action Patent Appl. No. 096106210 dated May 27, 2009, 10 pages.

(Continued)

*Primary Examiner* — Manuel L Barbee
(74) *Attorney, Agent, or Firm* — Howard & Howard Attorneys PLLC

(57) ABSTRACT

In a trajectory information processing apparatus (201) for equalizing the sensitivity of input near a starting point of a trajectory input to the extent possible, regardless of direction of movement, the trajectory information processing apparatus (201) including an input receiving unit (202) receives input of coordinate information of a trajectory at a first definition, a correcting unit (203) corrects the coordinate information of the trajectory based on a pair of coordinates of a starting point of the trajectory at the first definition and a pair of coordinates of the starting point of the trajectory at a second definition lower than the first definition, a converting unit (204) converts the corrected trajectory coordinate information to the second definition and outputs the converted coordinate information, the correcting unit (203), if the starting point locates on an edge of an area which includes the starting point at the first definition, and includes pairs of coordinates which are to be converted to a same pair of coordinates at the second definition, then corrects the pairs of position coordinates of the trajectory so that the starting point of the trajectory is located further inside than said edge of the area.

9 Claims, 4 Drawing Sheets

U.S. PATENT DOCUMENTS

| | | | |
|---|---|---|---|
| 6,366,866 B1 | 4/2002 | Kanagawa et al. | |
| 2002/0060668 A1* | 5/2002 | McDermid | 345/173 |
| 2008/0100586 A1* | 5/2008 | Smart | 345/173 |

FOREIGN PATENT DOCUMENTS

| | | |
|---|---|---|
| JP | 1-237818 A | 9/1989 |
| JP | 8-30392 A | 2/1996 |
| JP | 2005-204754 A | 8/2005 |
| JP | 2005-237680 A | 9/2005 |
| TW | M262770 A | 4/2005 |

OTHER PUBLICATIONS

European Search Report EP07714266 dated Mar. 11, 2009, 5 pages.
International Search Report PCT/JP2007/052736 dated Apr. 17, 2007.

* cited by examiner

TRACK INFORMATION PROCESSOR, TRACK INFORMATION PROCESSING METHOD, INFORMATION RECORDING MEDIUM, AND PROGRAM

TECHNICAL FIELD

The present invention relates to a trajectory information processing apparatus and a trajectory information processing method suitable for equalizing the sensitivity of input near a starting point of a trajectory input to the extent possible regardless of movement direction, a computer readable information recording medium storing a program for realizing these on a computer, and the program.

BACKGROUND ART

Conventionally, coordinate input devices that employ a touch pen and touch panel have been utilized in PDA (Personal Data Assistance) devices, handheld game devices, and the like. Additionally, systems in which various selections are made by touching a touch panel with a finger, such as cash dispensers and railway ticket machines, have also been proposed. Such a technique is disclosed in the following literature:

Patent Literature 1: Unexamined Japanese Patent Application KOKAI Publication No. 2005-204754

Here, in this [Patent Literature 1], there has been proposed a game device that is based on a touch panel. In this literature, a technique for determining a type of attack on an enemy character based on the graphical shape of an input trajectory when a predetermined graphic is drawn by a player on a touch panel using a finger is disclosed.

With such touch panel based input, processing such as position correction is generally performed prior to use to compensate for the definition (resolution) of the touch panel itself and the difference when a person inputs information using a finger or touch pen.

Specifically, in a case where position input is performed using a finger, a difference in position specification resulting from the thickness of the finger arises. As a result, the pair of position coordinates obtained using the resolution of the touch panel itself are also often converted to pairs of position coordinates at a lower definition (resolution) so as to eliminate slight wigwag.

DISCLOSURE OF THE INVENTION

Problem to be Solved by the Invention

Nevertheless, when a person touches a touch panel using a finger or touch pen so as to draw a trajectory and the definition is lowered as described above, a significant difference may arise in the amount of movement reflected immediately after contact with the finger or pen depending on the movement direction, according to whether or not the original starting point of the trajectory on the touch panel is near the border of the pairs of position coordinates for which the definition was lowered.

On the other hand, when a person draws a trajectory, the behavior of that starting point is extremely important in terms of ease of input.

For these reasons, there is a great demand for equalizing the sensitivity of input immediately after a starting point to the extent possible, no matter the location of the pair of coordinates of that starting point, regardless of the direction of movement.

The present invention has been made to overcome such problems, and it is an object of the present invention to provide a trajectory information processing apparatus and a trajectory information processing method suitable for equalizing the sensitivity of input near a starting point of a trajectory input to the extent possible regardless of movement direction, a computer readable information recording medium storing a program for realizing these on a computer, and the program.

Means for Solving the Problem

To achieve the above objective, the following will be disclosed according to the principles of the present invention.

A trajectory information processing apparatus according to a first aspect of the present invention includes an input receiving unit, a correcting unit, and a converting unit, which are configured as follows.

That is, the input receiving unit receives input of coordinate information of a trajectory at a first definition.

Typically, the input receiving unit is a device that receives trajectory input during the period the touch panel is touched by a touch pen or finger. Cases where a trajectory is drawn by holding down a mouse button and moving and dragging the mouse, and cases where input of three-dimensional trajectory coordinate data is received via a computer communication network are also included.

Meanwhile, the correcting unit corrects the coordinate information of the trajectory whose input was received, based on a pair of coordinates of a starting point of the trajectory at the first definition and the pair of coordinates of the starting point of the trajectory at a second definition lower than the first definition.

For example, in a case where the definition (resolution) of the input receiving unit is 640 dots×480 dots (first definition) and this definition is to be converted to a lower 80 dots×60 dots definition (second definition), 8 dots×8 dots of the coordinates of the trajectory input at the first definition are to be converted to 1 dot at the second definition. In such a case, correction is performed.

Meanwhile, the converting unit converts the corrected coordinate information of the trajectory to the second definition, and outputs the converted coordinate information.

In the above example, while the converting unit needs only to divide the coordinate values by eight if the coordinate information is to be converted without correction, in the present invention, because the correcting unit performs correction such as described below, the converting unit converts the pairs of position coordinates of the trajectory at a definition of 640 dots×480 dots to pairs of position coordinates of a trajectory at a definition of 80 dots×60 dots using the coordinate values after correction.

Here, the correcting unit, if the starting point locates on an edge of an area which includes the starting point at the first definition, and includes pairs of coordinates which are to be converted to a same pair of coordinates at the second definition, then corrects the pairs of position coordinates of the trajectory so that the starting point at the trajectory is located further inside than the edge of the area.

In the above example, when the starting point is located somewhere within 8 dots×8 dots at the first definition, that starting point may be located near the edge of the 8 dots×8 dots and then moved in a certain direction. In a case where the starting point is moved in a direction that crosses over this edge, the coordinate values at the second definition change even if there is simply a one-dot shift at the first definition. On the other hand, in a case where the starting point is moved in any other direction, the coordinate values at the second definition do not change. To prevent such a change in sensitivity, the position of the grid of 8 dots×8 dots is corrected so that the position of the starting point is located further inside than the edge of the 8 dots×8 dots.

Similar correction is desirable even in cases where the starting point is not located on the edge of the area, and such cases are included in the scope of the present invention as well. Additionally, the width of the "edge" and the size of the "inside" may be suitably changed according to the field of application.

According to the present invention, in a case where the definition of a trajectory input is to be converted to a lower definition, it is possible to equalize the sensitivity resulting from the movement direction of the starting point of the trajectory input to the extent possible, regardless of the movement direction.

Further, in the trajectory information processing apparatus of the present invention, the correcting unit can be configured so that the pairs of position coordinates of the trajectory are corrected so that the position of the starting point is at the substantial center of the area.

The present invention is according to the preferred embodiments of the above-described invention. While in the above example, correction is performed when the starting point is located on the edge of the 8 dot×8 dot area so that the starting point location is at a location further inside than the edge, in the present invention correction is performed so that the starting point location is at the center of the area in particular.

According to the present invention, in a case where the definition of a trajectory input is to be converted to a lower definition, it is possible to further equalize the sensitivity resulting from the movement direction of the starting point of the trajectory input to the extent possible, regardless of the movement direction.

Further, the trajectory information processing apparatus of the present invention can be configured as follows.

That is, the coordinate information of the trajectory is two-dimensional coordinate, and the pair of position coordinates of the starting point is (p, q).

The correcting unit then uses a predetermined integer D and a round-down operation floor(•) to correct the pair of coordinates (x, y) of a point included in the coordinate information of a trajectory whose input was received to a pair of coordinates (x', y') determined by the following:

$$(x',y')=(x+\text{floor}((p+D/2)/D)\times D-p, y+\text{floor}((q+D/2)/D)\times D-q)$$

Furthermore, the converting unit converts the pair of coordinates (x', y') of the point included in the corrected coordinate information of the trajectory to a pair of coordinates (x", y") at the second definition determined by the following:

$$(x'',y'')=(\text{floor}(x'/D),\text{floor}(y'/D))$$

The present invention is according to the preferred embodiments of the above-described invention, and illustrates an example of a specific calculation method. The calculations of the present invention are all assumed to be performed based on integer operations, making it possible to easily and quickly execute correction and conversion even with a small-sized information processing device, such as one with limited computing capability, such as a handheld game device.

Further, the trajectory information processing apparatus of the present invention can be configured so that, in a case where $D=2^w$ given an integer w, the correcting unit performs correction using a right shift operation >> and a bitwise AND operation & according to the following:

$$(x',y')=(x+(D>>1)-(p\&(D-1)), y+(D>>1)-(q\&(D-1)))$$

and the converting unit performs conversion according to the following:

$$(x'',y'')=(x'>>w, y'>>w)$$

The present invention is according to the preferred embodiments of the above-described invention, and illustrates an example of a specific calculation method. The calculations of the present invention are based on the power of two, division is performed using shift, and calculations for finding the remainder are performed using bitwise AND.

For example, in the above example, rather than dividing by eight, a right shift of three bits is performed and a bitwise AND operation with seven is used to find the remainder after division by eight.

According to the present invention, it is possible to easily and quickly execute correction and conversion even with a small-sized information processing device, such as one with limited computation capability, such as a handheld game device.

A trajectory information processing method according to another aspect of the present invention is executed in a trajectory information processing apparatus that includes an input receiving unit, a correcting unit, and a converting unit, and includes an input receiving step, a correcting step, and a converting step, which are configured as follows.

That is, in the input receiving step, the input receiving unit receives input of coordinate information of a trajectory at a first definition.

Meanwhile, in the correcting step, the correcting unit corrects the coordinate information of the trajectory whose input was received, based on a pair of coordinates of a starting point at the first definition and a pair of coordinates of the starting point at a second definition lower than the first definition.

Further, in the converting step, the converting unit converts the corrected coordinate information of the trajectory to the second definition, and outputs the converted coordinate information.

Then, in the correcting step, if the starting point locates on the edge of an area which includes the starting point at the first definition, and includes pairs of coordinates which are to be converted to a same pair of coordinates at the second definition, then the pairs of position coordinates of the trajectory are corrected so that the starting point of the trajectory is located further inside than the edge of the area.

A program according to another aspect of the present invention is constituted so as to cause a computer to function as the trajectory information processing apparatus described above, and to execute the trajectory information processing method described above on the computer.

The program of the present invention can be recorded on a computer readable information recording medium, such as a compact disk, a flexible disk, a hard disk, a magneto-optical disk, a digital video disk, a magnetic tape, or a semiconductor memory.

The program can be distributed and sold, independently of a computer which executes the program, over a computer communication network. The information recording medium can be distributed and sold independently of the computer.

Effect of the Invention

According to the present invention, it is possible to provide a trajectory information processing apparatus and a trajectory information processing method suitable for equalizing the sensitivity of input near a starting point of a trajectory input to the extent possible regardless of movement direction, a computer readable information recording medium storing a program for realizing these on a computer, and the program.

Figure 1:
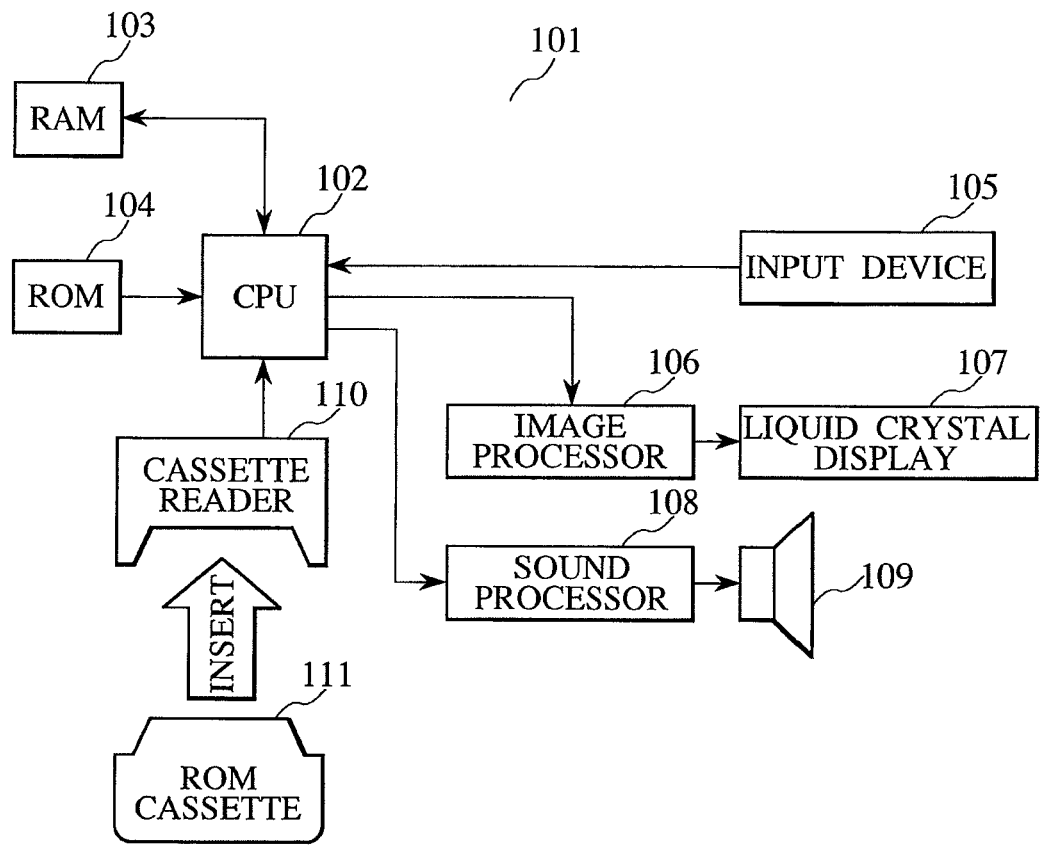
FIG. 1 is a schematic diagram illustrating the schematic configuration of a typical information processing device on which a trajectory information processing apparatus of the present invention will be realized.

DESCRIPTION OF REFERENCE NUMERALS 101 information processing device
102 CPU
103 RAM
104 ROM
105 input device
106 image processor
107 liquid crystal display
108 sound processor
109 speaker
110 cassette reader
201 trajectory information processing apparatus
202 input receiving unit
203 correcting unit
204 converting unit
401 touch panel
402 starting point of trajectory
403 grid
501 game device
502 liquid crystal screen
503 liquid crystal screen
504 arrow
505 trajectory
506 touch pen
507 starting point of trajectory

BEST MODE FOR CARRYING OUT THE INVENTION

An embodiment of the present invention will be described below. While the following describes an embodiment in which the present invention is realized for ease of understanding on an information processing device for handheld game devices, the embodiment to be described below is given by way of illustration only, and not to limit the scope of the invention. Therefore, persons skilled in the art can employ embodiments in which the individual elements or all the elements are replaced with equivalent ones, and which are also encompassed in the scope of the invention.

Embodiment 1

FIG. 1 is an explanatory diagram illustrating the schematic configuration of a general information processing device on which a trajectory information processing apparatus of the present invention will be realized. A description is given below with reference to this drawing.

The information processing device 101 comprises a CPU (Central Processing Unit) 102, a RAM (Random Access Memory) 103, a ROM (Read Only Memory) 104, an input device 105, an image processor 106, a liquid crystal display 107, a sound processor 108, a speaker 109, and a cassette reader 110.

The CPU 102 controls each unit of the information processing device 101. The storage area of the RAM 103, the storage area of the ROM 104, and the storage area of a ROM cassette 111 inserted in the cassette reader 110 are all mapped in a single memory space managed by the CPU 102, and the CPU 102 is capable of acquiring information stored therein by reading the respective addresses at which the storage areas are mapped. The storage area of the RAM 103 is also writable.

Additionally, the register that serves as an interface when the CPU 102 provides various commands to the image processor 106 and the sound processor 108 and acquires information from the input device 105 is also mapped in the memory space, making it possible to provide commands when data expressing a command are written to a predetermined address, and acquire information when the data are read from the predetermined address.

When the power supply of the information processing device 101 is turned on, the CPU 102 executes a program that is started from the address at which the storage area of the ROM cassette 111 inserted in the cassette reader 110 is mapped. The RAM 103 is used as a temporary storage area for a variety of purposes. The RAM 104 stores a BIOS (Basic Input/Output System) routine provided by the information processing device 101 that can be suitably called from the program within the ROM cassette 111.

The input device 105 reflects the input from buttons that receive command input expressing direction and the input from buttons that receive command input distinguishing various operations into a register mapped in the memory space, and also receives input indicating whether or not the touch panel affixed to the front surface of the liquid crystal display 107 has been pressed and, if so, receives the input of the pairs of coordinates thereof.

The liquid crystal display 107 is managed by the image processor 106. When the CPU 102 writes values generated by calculations and appropriately transfers information from the ROM cassette 111 inserted in the cassette reader 110 to the storage area for storing tiles mapped in the memory space and to the storage area for storing object attribute memory, a sprite image is displayed on the liquid crystal display 107.

The number of liquid crystal displays 107 is generally one or a plurality. In the case of a plurality, one liquid crystal display 107 may be configured as display-dedicated while the other liquid crystal display 107 may have a touch panel affixed thereto.

Furthermore, the information processing device 101 is used as a typical handheld game device, and the technology of storage area management of the present invention is applied to the management of the area in which tiles are stored. Nevertheless, the technology of storage area management of the present invention may be applied to general computers as well due to the bias that exists in sizes preferably maintained, and such an embodiment is also included in the scope of the present invention.

(Trajectory Information Processing Apparatus)

Figure 2:
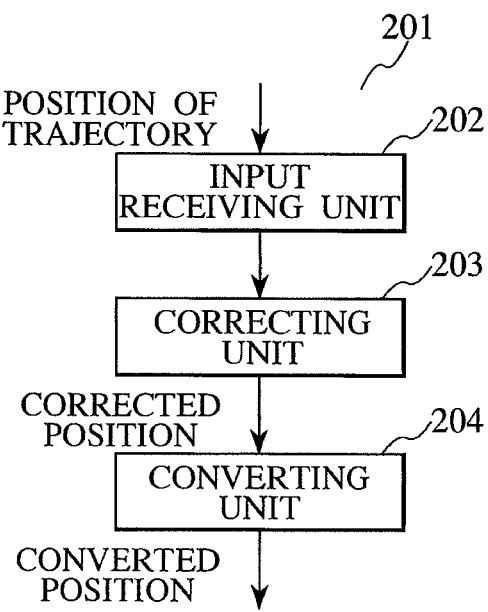
FIG. 2 is a schematic diagram illustrating the schematic configuration of a trajectory information processing apparatus according to the embodiment.

FIG. 2 is an explanatory diagram illustrating the schematic configuration of a trajectory information processing apparatus realized by executing a program on the information processing apparatus described above. A description is given below with reference to this drawing.

As shown in the figure, a trajectory information processing apparatus 201 comprises an input receiving unit 202, a correcting unit 203, and a converting unit 204.

That is, the input receiving unit 202 receives input of coordinate information of a trajectory at a first definition.

In this embodiment, the touch panel of the input device 105 of the information processing device 101 is used as the input receiving unit 202. The following information inputs are acquired from the touch panel:

(a) Whether or not a finger or touch pen is presently in contact with the touch panel. Hereinafter, the state in which a finger or touch pen is in contact with the touch panel is referred to as "pressed," and the state in which a finger or touch pen is moved away from the touch panel is referred to as "released."

(b) The point of the pairs of position coordinates pressed by the finger or touch pen. This embodiment will be described using a first definition of 640 dots×480 dots as the definition (resolution) of the touch panel.

On the other hand, the correcting unit 203 corrects the coordinate information of the trajectory whose input was received, based on the pair of coordinates of the starting point of the trajectory at the first definition and the pair of coordinates of the starting point of the trajectory at second definition lower than the first definition.

In this embodiment, the CPU 102 functions as the correcting unit 203 in cooperation with the input device 105.

The second definition is a definition (resolution) for making the information from the touch panel coarser, and is given as 80 grids×60 grids as an example in the explanation below. In this configuration, one grid corresponds to 8 dots×8 dots.

Then, the converting unit 204 converts the corrected coordinate information of the trajectory to the second definition, and outputs the converted coordinate information.

In the above example, the pair of coordinates (x, y) at the first definition is converted to the pair of coordinates (x/8, y/8) at the second definition using integer division (dropping the remainder). Or, to further align the coordinates with the coordinates of the liquid crystal display 107, the coordinates are converted in a manner such as ((x/8)×8+3, (y/8)×8+3). Here, three is added to each coordinate so as to establish the dot at the center of the grid as the representative point.

In the present embodiment, the pair of coordinates (x, y) at the first definition is corrected to (x', y'), and subsequently converted to (x", y")=(x'/8, y'/8) or (x", y")=((x/8)×8+3, (y/8)×8+3) as the pairs of coordinates at the second definition.

Figure 3:
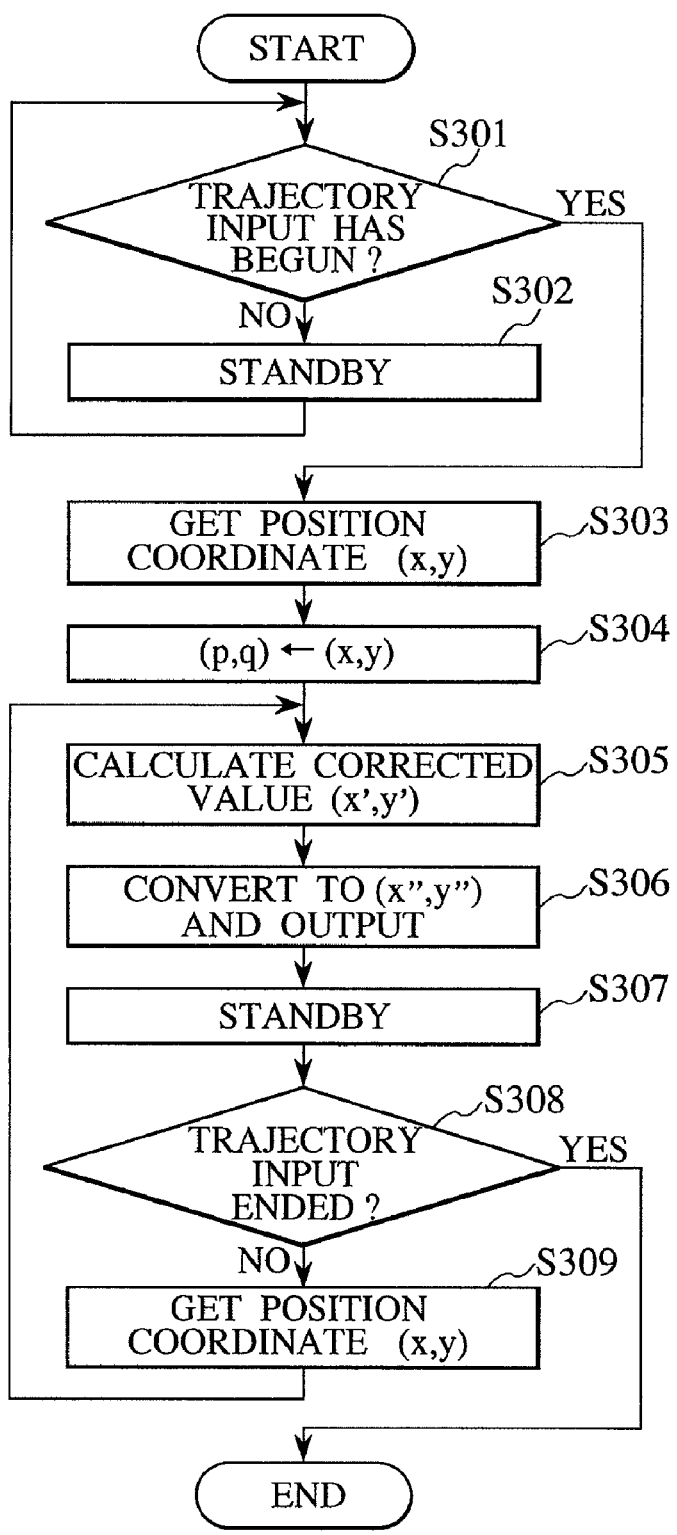
FIG. 3 is a flowchart illustrating the flow of control of a trajectory information processing method executed on a trajectory information processing apparatus according to the embodiment.

FIG. 3 is a flowchart illustrating the flow of control of the trajectory information processing method executed in the trajectory information processing apparatus 201. A detailed explanation will now be provided, including an explanation of the processing performed in the correcting unit 203, with reference to this figure.

When this processing is started, first the CPU 102 monitors the input device 105 and checks whether or not trajectory input has started, that is, whether or not the state of the touch panel has changed from a released state to a pressed state (step S301).

If the state is still a released state (step S301; No), the CPU 102 waits a certain period of time (step S302), and then returns to step S301. Other operations can be executed as co-routines during the standby. Additionally, an interrupt may be generated at the moment when the touch panel is initially pressed so as to perform transition processing.

When the state of the touch panel changes to a pressed state and trajectory input has begun (step S301; Yes), the CPU 102 gets the currently pressed pair of position coordinates (x, y) of the touch panel at the first definition from the input device (step S303), and holds the value (x, y) within the RAM 103 as the pair of position coordinates (p, q) of the starting point, until the processing ends (step S304).

Next, the correcting unit 203 performs correction (step S305).

FIG. 4 is an explanatory diagram showing an overview of the correction performed by the correcting unit 203. A description is given below with reference to this drawing.

Figure 4A:
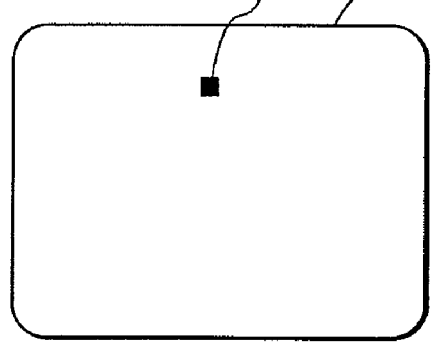
FIG. 4 is an explanatory diagram showing an overview of the correction performed by the correcting unit.

In FIG. 4A, a starting point 402 of a trajectory at the first definition is displayed on a touch panel 401.

Figure 4B:
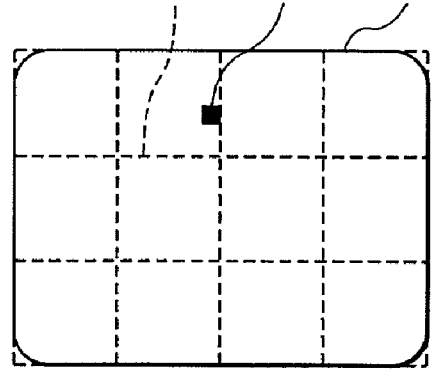

On the other hand, FIG. 4B illustrates an assignment technique equivalent to conventional techniques wherein assignment using a grid 403 at a second definition (note that the number of grids 403 is reduced to a number less than that in the above example for ease of understanding; also, the boundaries between grids are shown as dashed lines) is simply performed to respective pairs of coordinates of the touch panel 401.

As shown in FIG. 4B, the starting point 402 of the trajectory exists close to the right-side edge of the grid 403. Thus, the lateral coordinate of the grid 403 is quickly increased by one when the user moves the touched position just slightly to the right. On the other hand, the lateral coordinate of the grid 403 does not change when the user moves the touched position the same amount to the left.

Figure 4C:
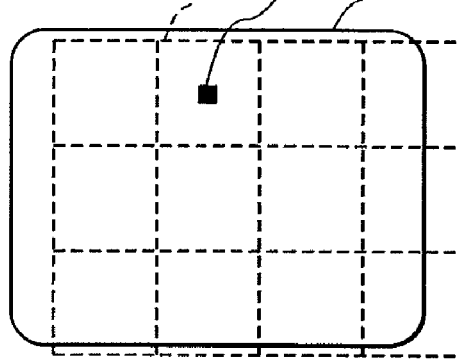

Generally, the sensitivity of the touch panel at the moment when the touch panel is pressed by a touch pen or finger is the element that most concerns the user, and changing the sensitivity according to the direction in which the finger or touch pen is dragged defies the institution of the user. Here, as shown in FIG. 4C, the grid 403 is shifted so that the starting point 402 of the trajectory is disposed near the center of the grid 403, thereby correcting the correspondence relationship with each of the pairs of coordinates of the touch panel 401.

The specific calculation method will now be explained in detail. In this embodiment, since the grid is 8 dots×8 dots, given a dot width of eight as the predetermined integer D, $D=8=2^3$.

In this case, because D is a power of two, the division process which drops the remainder and the calculation process which finds the remainder can be simply calculated using right shift and bitwise AND operations, respectively.

That is, the pair of coordinates after correction (x', y') is corrected using the pair of coordinates (x, y) whose input was received and the pair of coordinates (p, q) of the starting point as follows:

$$(x',y')=(x+(D>>1)-(p\&(D-1)), y+(D>>1)-(q\&(D-1)))$$

Specifically, the calculation is as follows:

$$(x',y')=(x+4-(p\&7), y+4-(q\&7)),$$

where the symbol & represents the bitwise AND. Additionally, ((D>>1)−1) may be used in place of (D>>1) in the correction formula.

Next, the converting unit 204 converts the corrected pair of position coordinates (x', y') to the pair of position coordinates (x", y"), and outputs the converted pair of position coordinates (x", y") (step S306). When $D=2^W$, the calculation method of this embodiment is:

$$(x'',y'')=(x'>>w, y'>>w).$$

And, because w=3 in this embodiment, this equation becomes:

$$(x'',y'')=(x'>>3, y'>>3),$$

where the symbol >> represents right shift.

Then, the CPU 102 waits a predetermined wait time (step S307). Other processing can be performed during standby, in the same manner as described above. Subsequently, the CPU 102 monitors the input device 105 and checks whether or not trajectory input has ended, that is, whether or not the state of the touch panel has changed from a pressed state to a released state (step S308).

When trajectory input has ended (step S308; Yes), the processing ends. On the other hand, when trajectory input has not ended (step S308; No), the CPU 102 gets the pair of position coordinates (x, y) of the currently pressed position of the touch panel at the first definition from the input device 105 (step S309), and the flow returns to step S305.

Consider a case where the area of D dots×D dots at the first definition is generally equivalent to one grid at a second definition.

The correcting unit 203 then uses the predetermined integer D and the round-down operation floor(•) to correct the pair of coordinates (x, y) of a point included in the coordinate information of a trajectory whose input was received to the pair of coordinates (x', y') determined by the following:

$$(x',y')=(x+\text{floor}((p+D/2)/D)\times D-p, y+\text{floor}((q+D/2)/D)\times D-q)$$

or to:

$$(x',y')=(x+\text{floor}((p+D/2-1)/D)\times D-p, y+\text{floor}((q+D/2-1)/D)\times D-q).$$

On the other hand, the converting unit 204 converts the pair of coordinates (x', y') of a point included in the corrected trajectory coordinate information to the pair of coordinates (x", y") at the second definition determined by the following:

(x", y")=(floor(x'/D), floor(y'/D)). Here, for the purpose of generalization, the division process includes values other than integers as well.

Further, while the above embodiment considers a two-dimensional area, correction and conversion can also be similarly performed with a three-dimensional or one-dimensional trajectory input, and such embodiments are included in the scope of the present invention as well.

In this manner, according to the present embodiment, it is possible to equalize the sensitivity of input near the starting point of a trajectory input to the extent possible, regardless of the movement direction.

Figure 5:
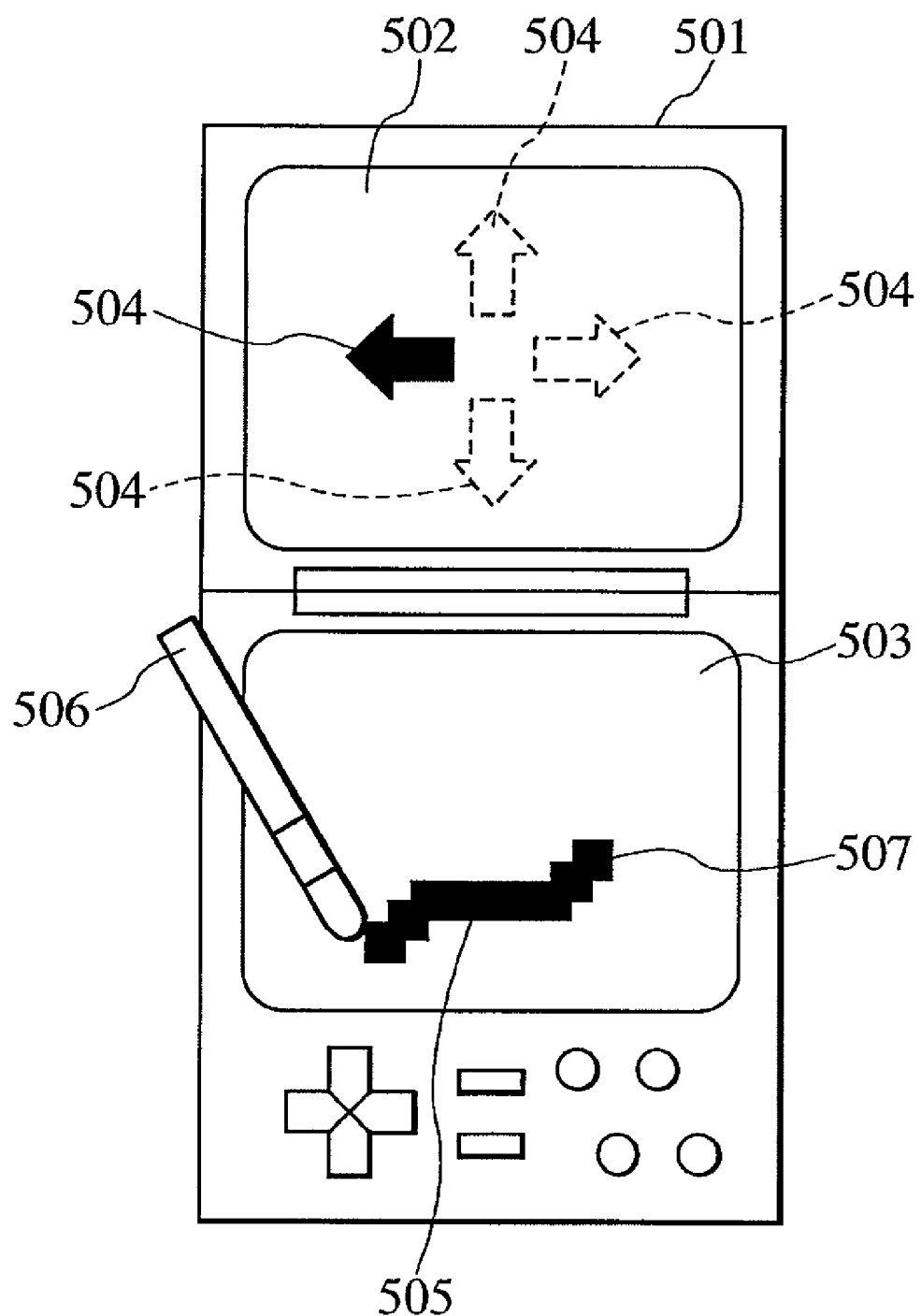
FIG. 5 is an explanatory diagram showing a display screen of a game device to which the trajectory information processing apparatus according to the embodiment is applied.

The configuration of such an embodiment is preferably, for example, a game device as described below. FIG. 5 is an explanatory diagram showing a display example of a screen of a game device to which the embodiment has been applied. A description is given below with reference to this drawing.

As shown in this figure, a game device 501 includes two liquid crystal screens 502 and 503. The liquid crystal screen 502 is a display-dedicated screen, and the liquid crystal screen 503 functions as the touch panel 401 as well.

Here, on the liquid crystal screen 502, a challenge presented to a player from the game device 501 is displayed, and the player answers to the challenge on the liquid crystal screen 503 (the touch panel 401) using a touch pen 506 or a finger.

The challenge displayed on the liquid crystal screen 502 is similar to the so-called flag game, instructing the player to place the touch pen 506 on the screen and move it in the direction of an arrow 504. In the figure, the arrows 504 of directions other than the direction of the challenge to be answered are displayed using dashed lines, and the arrow 504 of the direction of the challenge to be answered is displayed using a solid line.

On the other hand, the liquid crystal screen 503 displays a trajectory 505, which is a dot drawing at a lower definition that was drawn using the touch pen 506, etc. The trajectory 505 is drawn from a starting point 507 to the left. This is because the direction of the challenge to be answered is left.

These challenges are presented in series at a predetermined rhythm, and the player repeatedly places the touch pen 506 on and moves and releases the touch pen 506 from the liquid crystal screen 503 (the touch panel 401) in accordance with the rhythm at which the challenges appear. Thus, because the player is required to quickly answer the challenges displayed on the liquid crystal screen 502, the player has little opportunities to directly view the liquid crystal screen 503. As a result, the position of the starting point 507 varies on the liquid crystal screen 503.

The trajectory information processing apparatus according to the above embodiment is preferably, in particular, such a game device. With the trajectory information processing apparatus of the above embodiment, the length of the smallest unit at which movement is detected is substantially the same no matter the direction of movement, whether it be up, down, left, or right, even when the movement from the starting point of the trajectory is detected upon lowering the definition. Thus, the direction of movement immediately after the touch pen or finger is placed on the touch panel is appropriately acquired.

The processing result from the trajectory information processing apparatus obtained in this manner can be reflected in parameters such as the percentage of correctly answered challenges of the game device as described above, or can be further used for parameters such as character strength, etc.

Further, the trajectory information processing apparatus of the above embodiment is also preferably applied to a game device where the movement of the character is controlled through use of a power (for example, simulated wind power, etc.) which moves the character "in the first direction in which the touch pen is moved after placement on the touch panel".

Note that the present application claims priority based on Japanese Patent Application No. 2006-040445, the contents of which are incorporated herein by reference to the fullest extent permitted by the law of the designated country.

INDUSTRIAL APPLICABILITY

As described above, according to the present invention, it is possible to provide a trajectory information processing apparatus and a trajectory information processing method suitable for equalizing the sensitivity of input near a starting point of a trajectory input to the extent possible regardless of movement direction, a computer readable information recording medium storing a program for realizing these on a computer, and the program.

The invention claimed is:

1. A trajectory information processing apparatus comprising:
    an input receiving unit that receives input of coordinate information of a trajectory at a first definition;
    a correcting unit that corrects coordinate information of said trajectory whose input was received, based on a pair of coordinates of a starting point of the trajectory at the first definition and a pair of coordinates of the starting point of the trajectory at a second definition lower than the first definition; and a converting unit that converts said corrected coordinate information of the trajectory to the second definition, and outputs said converted coordinate information, wherein: said correcting unit, if the starting point locates on an edge of an area which includes the starting point at the first definition, and includes pairs of coordinates which are to be converted to a same pair of coordinates at the second definition, then corrects the pairs of position coordinates of the trajectory so that the starting point of the trajectory is located further inside than the edge of the area.

2. The trajectory information processing apparatus according to claim 1, wherein:
said correcting unit corrects the pairs of position coordinates of the trajectory so that the position of the starting point is at the substantial center of the area.

3. The trajectory information processing apparatus according to claim 2, wherein:
the coordinate information of the trajectory is two-dimensional coordinate information;
the pair of position coordinates of the starting point is (p, q);
said correcting unit uses a predetermined integer D and a round-down operation "floor" (•) to correct the pair of coordinates (x, y) of a point included in the coordinate information of the trajectory whose input was received to pair of coordinates (x', y') determined by the following:

$(x',y')=(x+\text{floor}((p+D/2)/D)\times D-p, y+\text{floor}((q+D/2)/D)\times D-q);$ and said converting unit converts the pair of coordinates (x', y') of a point included in said corrected coordinate information of the trajectory to pair of coordinates (x", y") of the second definition determined by the following:

$(x'',y'')=(\text{floor}(x'/D),\text{floor}(y'/D)).$

4. The trajectory information processing apparatus according to claim 3, wherein:
in a case where $D=2^w$ where w is an integer, said correcting unit executes correction using a right shift operation >> and a bitwise AND & operation according to the following:

$(x',y')=(x+(D>>1)-(p\&(D-1)), y+(D>>1)-(q\&(D-1)));$ and said converting unit executes conversion according to the following:

$(x'',y'')=(x'>>w, y'>>w).$

5. A trajectory information processing method comprising:
a displaying step of displaying indicia on a display screen, the indicia representing an object;
an input receiving step of receiving input by the user on a touchscreen device, the touchscreen device being associated with the display screen, the input defining of coordinate information of a trajectory at a first definition;
a correcting step of correcting the coordinate information of said trajectory whose input was received, based on a pair of coordinates of a starting point of the trajectory at the first definition and a pair of coordinates of the starting point of the trajectory at a second definition lower than the first definition;
a converting step of converting said corrected coordinate information of the trajectory to the second definition, and outputting said converted coordinate information, wherein:
in said correcting step, if the starting point locates on an edge of an area which includes the starting point at the first definition, and includes pairs of coordinates which are to be converted to a same pair of coordinates at the second definition, then the pairs of position coordinates of the trajectory are corrected so that the starting point of the trajectory is located further inside than the edge of the area; and,
a transformation step of changing an operating state of the object as a function of the converted coordinate information and a set of predefined rules.

6. A trajectory information processing method, as set forth in claim 5, wherein the object is a button and the operating state is one of on and off.

7. A trajectory information processing method, as set forth in claim 5, wherein the object is a character object, and the operating state is at least one of a position, orientation, and direction.

8. A trajectory information processing method, as set forth in claim 5, wherein the object is a challenge and the operating state is at least one of a correct and incorrect.

9. A non-transitory computer-readable information recording medium storing a program for controlling a computer to function as:
an input receiving unit that receives input of coordinate information of a trajectory at a first definition;
a correcting unit that corrects coordinate information of said trajectory whose input was received, based on a pair of coordinates of a starting point of the trajectory at the first definition and a pair of coordinates of the starting point of the trajectory at a second definition lower than the first definition; and
a converting unit that converts said corrected coordinate information of the trajectory to the second definition, and outputs said converted coordinate information, wherein:
said correcting unit, if the starting point locates on an edge of an area which includes the starting point at the first definition, and includes pairs of coordinates which are to be converted to a same pair of coordinates at the second definition, then corrects the pairs of position coordinates of the trajectory so that the starting point of the trajectory at the first definition is located further inside than said edge of the area.

* * * * *